United States Patent
Van Phan et al.

(10) Patent No.: US 10,154,528 B2
(45) Date of Patent: Dec. 11, 2018

(54) HANDLING OF PROXIMITY SERVICES DEVICE TO DEVICE RELATED IDENTITIES AT RADIO ACCESS NETWORK LEVEL

(71) Applicant: Nokia Solutions and Networks Oy, Espoo (FI)

(72) Inventors: Vinh Van Phan, Oulu (FI); Manivannan Thyagarajan, Coppell, TX (US); Ling Yu, Kauniainen (FI); David Navratil, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/545,977

(22) PCT Filed: Jan. 29, 2015

(86) PCT No.: PCT/US2015/013544
§ 371 (c)(1),
(2) Date: Jul. 24, 2017

(87) PCT Pub. No.: WO2016/122533
PCT Pub. Date: Aug. 4, 2016

(65) Prior Publication Data
US 2018/0035477 A1 Feb. 1, 2018

(51) Int. Cl.
*H04W 4/00* (2018.01)
*H04W 76/11* (2018.01)
*H04W 76/14* (2018.01)
*H04W 8/26* (2009.01)
(Continued)

(52) U.S. Cl.
CPC ............ *H04W 76/11* (2018.02); *H04L 67/146* (2013.01); *H04W 4/70* (2018.02); *H04W 8/26* (2013.01);
(Continued)

(58) Field of Classification Search
CPC ....... H04W 76/11; H04W 4/70; H04W 76/14; H04W 4/005; H04W 76/021; H04W 76/023; H04W 8/26; H04L 67/146
See application file for complete search history.

(56) References Cited

U.S. PATENT DOCUMENTS 7,177,321 B2    2/2007  Bae
2011/0029645 A1  2/2011  Baykal et al.
(Continued)

OTHER PUBLICATIONS

"3rd Generation Partnership Project; Technical Specification Group Services and System Aspects; Study on extended architecture support for Proximity-based services (Release 13)", 3GPP TR 23.713, V0.3.0, Nov. 2014, pp. 1-46.
(Continued)

*Primary Examiner* — Keith Fang
(74) *Attorney, Agent, or Firm* — Nokia Technologies Oy

(57) ABSTRACT

Handling of related identities may be valuable in communication systems. More particularly, in areas such as long term evolution advanced (LTE-A) proximity services (ProSe), it may be useful to provide for handling of ProSe device to device (D2D) related identities at the radio access network (RAN) level. A method can include deriving an initial layer one identifier corresponding to a target user equipment or group. The method can also include determining whether the initial layer one identifier collides with another layer one identifier corresponding to a different target user equipment or group. The method can further include communicating with the target user equipment or group based on the determination of whether the initial layer one identifier collides with another layer one identifier in use.

18 Claims, 4 Drawing Sheets

(51) Int. Cl.
  *H04W 4/70* (2018.01)
  *H04L 29/08* (2006.01)
  *H04W 76/40* (2018.01)
  *H04W 8/00* (2009.01)

(52) U.S. Cl.
  CPC ............ *H04W 76/14* (2018.02); *H04W 8/005* (2013.01); *H04W 76/40* (2018.02)

(56) References Cited

U.S. PATENT DOCUMENTS

| | | | |
|---|---|---|---|
| 2011/0274097 A1* | 11/2011 | Zhang | H04W 24/02 370/338 |
| 2012/0008571 A1 | 1/2012 | Li et al. | |
| 2013/0040677 A1 | 2/2013 | Lee et al. | |
| 2013/0148566 A1 | 6/2013 | Doppler et al. | |
| 2016/0344469 A1* | 11/2016 | Yi | H04W 76/14 |

OTHER PUBLICATIONS

International Search Report and Written Opinion received for corresponding Patent Cooperation Treaty Application No. PCT/US2015/013544, dated Apr. 21, 2015, 10 pages.

Extended European Search Report received for corresponding European Patent Application No. 15880429.4, dated Jun. 29, 2018, 11 pages.

"3rd Generation Partnership Project; Technical Specification Group Services and System Aspects; Proximity-based services (ProSe); Stage 2 (Release 12)", 3GPP TS 23.303, V12.3.0, Dec. 2014, pp. 1-63.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.4.0, Dec. 2014, pp. 1-251.

* cited by examiner

HANDLING OF PROXIMITY SERVICES DEVICE TO DEVICE RELATED IDENTITIES AT RADIO ACCESS NETWORK LEVEL

RELATED APPLICATION

This application was originally filed as PCT Application No. PCT/US2015/013544 filed Jan. 29, 2015.

BACKGROUND

Field

Handling of related identities may be valuable in communication systems. More particularly, in areas such as long term evolution advanced (LTE-A) proximity services (ProSe), it may be useful to provide for handling of ProSe device to device (D2D) related identities at the radio access network (RAN) level.

Description of the Related Art

Various identities are used in LTE-A ProSe D2D communications, as specified in 3GPP Release (Rel.) 12 so far. These identities include Source Layer-2 ID, which identifies the sender of the data in sidelink ProSe Direct Communication. The Source Layer-2 ID is 24 bits long and is used together with ProSe Layer-2 Group ID and LCD for identification of the receiving ProSe-RLC UM entity and receiving ProSe-PDCP entity.

The identities also include Destination Layer-2 ID, which identifies the target of the data in sidelink ProSe Direct Communication. The Destination Layer-2 ID is 24 bits long and is split in the MAC layer into two bit strings. A first bit string is the least significant bit (LSB) part (8 bits) of Destination Layer-2 ID and forwarded to physical layer as Sidelink Control Layer-1 ID. This identifies the target of the intended data in Sidelink Control and is used for filtering of packets at the physical layer. A second bit string is the most significant bit (MSB) part (16 bits) of the Destination Layer-2 ID and is carrier within the MAC header. This is used for filtering of packets at the MAC layer. The above provides only non-limiting examples of the IDs. It may be noted that IDs of different lengths may be possible as well. Similarly, distribution of the ID into the least and most significant parts may be done differently than explained above.

No Access Stratum signaling is required for group formation and to configure Source Layer-2 ID, Destination Layer-2 ID and Sidelink Control L1 ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. Thus, each UE may know the target group(s) it is associated with.

Further enhancements for supporting one-to-one ProSe D2D communications may be provided in Rel. 13, as described in third generation partnership project (3GPP) technical report (TR) 23.713, which is hereby incorporated herein by reference in its entirety.

The Sidelink Control Layer-1 ID can be referred to as L1 ID. There may be possible collisions in the L1 ID. That is, two (or more) different targeted users or user groups may have the same L1 ID. Therefore, the user equipment (UE) which is interested in receiving one of these multiple users or user groups may need to receive both (or all) physically and then L2 medium access control (MAC) may further filter out the group of interest and discard the other based on the MSB parts (16 bits) of the targeted Destination Layer-2 ID included in the header of the received MAC packet data unit (PDU).

SUMMARY

According to certain embodiments, a method can include deriving an initial layer one identifier corresponding to a target user equipment or group. The method can also include determining whether the initial layer one identifier collides with another layer one identifier corresponding to a different target user equipment or group. The method can further include communicating with the target user equipment or group based on the determination of whether the initial layer one identifier collides with another layer one identifier in use.

In certain embodiments, a method can include determining whether layer one identifier collision resolution is applicable to a user equipment or group. The method can also include monitoring a layer one transmission based on the determination of whether layer one identifier collision resolution is applicable to the user equipment or group.

An apparatus, according to certain embodiments, can include at least one processor and at least one memory including computer program code. The at least one memory and the computer program code can be configured to, with the at least one processor, cause the apparatus at least to derive an initial layer one identifier corresponding to a target user equipment or group. The at least one memory and the computer program code can also be configured to, with the at least one processor, cause the apparatus at least to determine whether the initial layer one identifier collides with another layer one identifier corresponding to a different target user equipment or group. The at least one memory and the computer program code can further be configured to, with the at least one processor, cause the apparatus at least to communicate with the target user equipment or group based on the determination of whether the initial layer one identifier collides with another layer one identifier in use.

An apparatus, in certain embodiments, can include at least one processor and at least one memory including computer program code. The at least one memory and the computer program code can be configured to, with the at least one processor, cause the apparatus at least to determine whether layer one identifier collision resolution is applicable to a user equipment or group. The at least one memory and the computer program code can also be configured to, with the at least one processor, cause the apparatus at least to monitor a layer one transmission based on the determination of whether layer one identifier collision resolution is applicable to the user equipment or group.

According to certain embodiments, an apparatus can include means for deriving an initial layer one identifier corresponding to a target user equipment or group. The apparatus can also include means for determining whether the initial layer one identifier collides with another layer one identifier corresponding to a different target user equipment or group. The apparatus can further include means for communicating with the target user equipment or group based on the determination of whether the initial layer one identifier collides with another layer one identifier in use.

In certain embodiments, an apparatus can include means for determining whether layer one identifier collision resolution is applicable to a user equipment or group. The apparatus can further include means for monitoring a layer one transmission based on the determination of whether layer one identifier collision resolution is applicable to the user equipment or group.

A non-transitory computer-readable medium can, according to certain embodiments, be encoded with instructions that, when executed in hardware, perform a process. The process can be any of the methods described above.

A computer program product can, in certain embodiments, encode instructions for performing a process. The process can be any of the methods described above.

BRIEF DESCRIPTION OF THE DRAWINGS

For proper understanding of the invention, reference should be made to the accompanying drawings, wherein.

DETAILED DESCRIPTION

Figure 1:
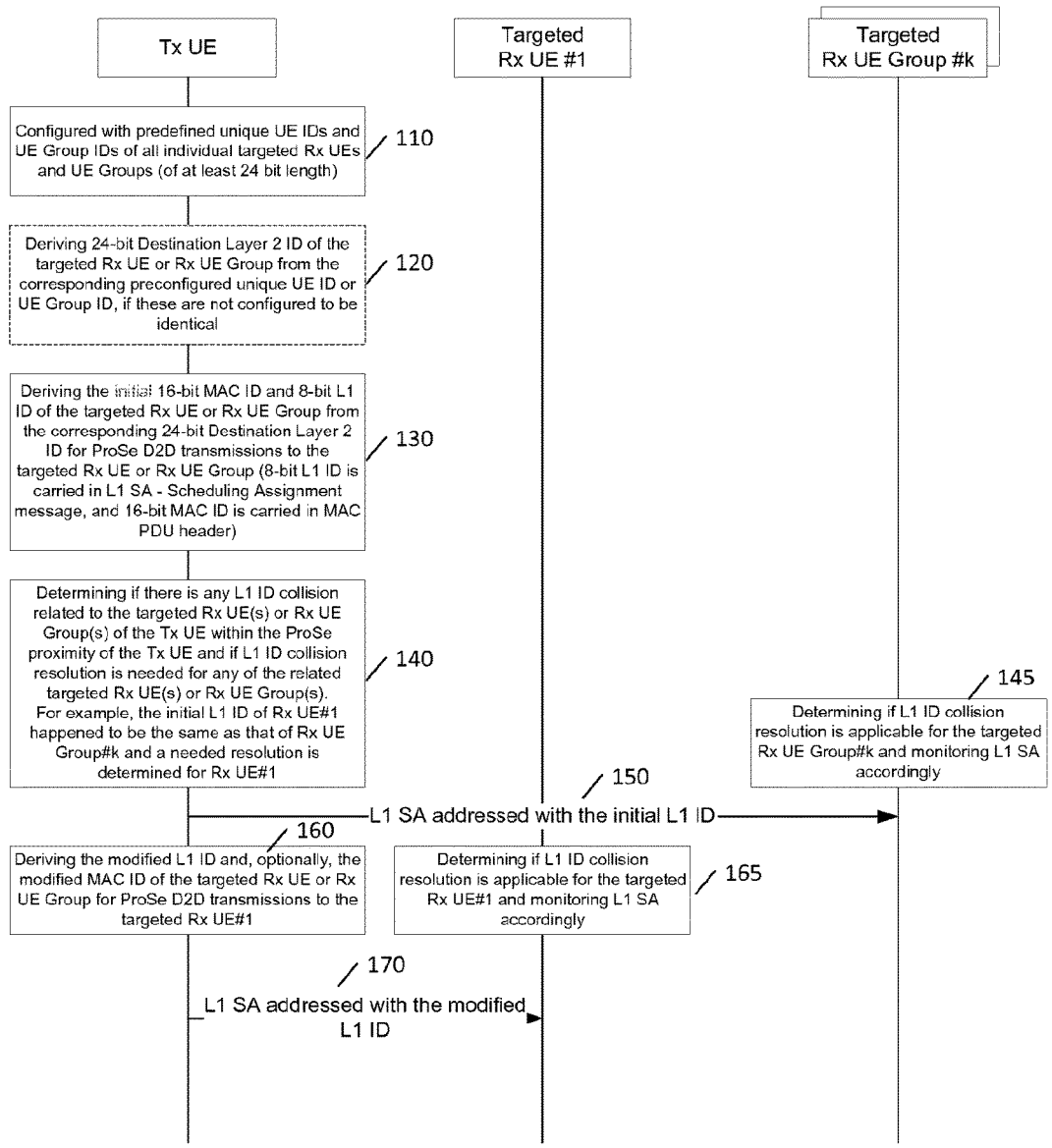
FIG. 1 illustrates a method according to certain embodiments.

Certain embodiments provide a method for controlling and handling L1 ID and the L2 ID used in MAC per individual targeted destination user or user group. The L2 ID used in MAC can be referred to as L2 MAC ID. In certain embodiments, such controlling and handling of IDs can be performed so that collision in L1 ID is resolved to a certain extent. Additionally, derivation of L1 ID and L2 MAC ID may be utilized as a security enhancing feature for ProSe D2D. Certain embodiments may be particularly useful in ProSe D2D communications for 1:1 cases or 1:M cases of special user groups in which only a particular user, the commanding one, may be speaking and the rest are listening.

Thus, certain embodiments provide a system and a method to control and determine L1 ID and L2 MAC ID at a transmitting UE and a receiving UE involved in direct 1:M broadcast-based ProSe D2D communications. Regarding the expression, 1:M broadcast as used in 3GPP, this term reflects the fact that there may not be any physical layer closed loop feedback, for example for HARQ ACK/NACK, power control, and the like. From a higher layer point of view, such a message can be considered broadcast if M is all, multicast if M is the number of group members, or unicast if M is 1.

In such a method, L1 ID may be a derivable part of a configured destination Layer-2 ID to be sent in a L1 control message from the transmitting UE. The destination Layer-2 ID can be the configured ID of the targeted receiving user or user group of the transmitting UE. The L1 control message may be received by the receiving UE in order to receive the upcoming ProSe D2D data transmissions from the transmitting UE, as specified for example in current 3GPP Rel. 12 for ProSe D2D.

The derivation of L1 ID from the configured destination Layer-2 ID can be based on rules configured by the serving network to all the individual users, either on the fly or not. The rules may be specific to the targeted receiving user or user group. The rules may enable the following steps.

For example, the transmitting UE may derive an initial L1 ID from the configured destination Layer-2 ID to address the corresponding targeted user or user group in L1. This may be done with relation to the current Rel. 12 ProSe, for example. Based on the configured rules on the targeted user or user group, the transmitting UE may use the initial L1 ID, as such, right away. Alternatively, the transmitting UE may determine whether this initial L1 ID is identical to any of determined L1 ID(s) of other targeted user groups the transmitting UE is either transmitting to or receiving from or both.

If there is a collision, meaning that this initial L1 ID is identical to at least one other L1 ID being used for transmission or reception, the transmitting UE can derive a modified version of the initial L1 ID according to the configured rules. If this modified version is determined as locally unique at the transmitting UE then the modified version can be used to transmit for the targeted user or user group. Alternatively, either the initial L1 ID or the modified version may be selected depending on the configured rules.

Having more than one modified version is possible. Having more than one modified version may help collision resolution at the transmitting UE in case collision involves more than two targeted users or user groups. However, the more possible modified versions are there, the higher the probability of false positive check at the receiving UE, and hence the less improvement in collision resolution or energy efficiency at the receiving UE.

The transmitting UE, otherwise, can determine that the initial L1 ID is to be used as such to transmit for the targeted user or user group. Thus, the initial L1 ID, such as described in Rel. 12, can always be used as a fall-back option.

The receiving UE may derive the initial L1 ID and, in determined cases, the modified version(s) of the initial L1 ID from the configured destination Layer-2 ID corresponding to the receiving UE or the targeted user group of the receiving UE, according to the configured rules. In determined cases, the receiving UE may initially monitor and receive for all the initial L1 ID and modified version(s). Then, higher layer may confirm to L1 (and optionally MAC) which L1 ID (and optionally MAC ID) L1 should continue to monitor and receive. The higher layer may be MAC or even IP and application control layer.

The determined cases may primarily aim for unicast ProSe D2D for 1:1 communications or single-transmitter groupcast ProSe D2D for hyper-advertising 1:M communications so that impact on the current Rel'12 is avoided. Thus, the transmitting UE may be configured to apply the proposed L1 ID contention resolution for only D2D unicast or single-transmitter groupcast cases, as determined by the transmitting UE. In certain embodiments, for unicast D2D the transmitting UE may initiate a handshake of the modified L1 ID, as determined using, for example, MAC signaling at the beginning of D2D session. Either the modified ID or the initial L1 ID can be used during the handshaking procedure.

The modified version of initial L1 ID may collide with L1 ID of another targeted user or user group. In this case, if L2 MAC ID is the MSB part (16 bits) of the Destination Layer-2 ID as agreed in 3GPP Rel. 12 and the MSB part of the layer-2 ID of the two targeted users or user groups is the same, the receiving UE may not be able to uniquely identify the data packet for each targeted user or user group based on L1 IDs and L2 MAC IDs.

Accordingly, certain embodiments may either provide a full Layer-2 ID in MAC header as L2 MAC ID or derive a modified L2 MAC ID based on configured rules from the initial L2 MAC ID, if the modified version of L1 ID is used. Thus, the pair of modified L1 ID and modified L2 MAC ID can still identify the same configured destination Layer-2 ID. For the latter, the configured rules may include not only the rules on deriving the modified L1 ID, but also the corresponding rules on deriving the modified L2 MAC ID accordingly. In addition, an implicit or explicit indication of applying the modified L1 ID and/or modified L2 MAC ID can be included to the receiving UE. The implicit or explicit indication can be included either in L1 scheduling assignment (SA) or in a MAC control information element (MAC CE or MAC PDU header).

The use of modified L2 MAC ID may be optional in case higher-layer (IP and above) may still need to be used to confirm uniqueness and correctness of the received UE.

According to the current specification in 3GPP rel. 12, the initial L1 ID is derived or computed by the transmitting UE using the function h1(k)=k mod 256. When collision on L1 ID is identified, certain embodiments can use different functions h2(k), h3(k) and so on or g1(h1(k)), g2(h1(k)), and so on, which can be configured to individual ProSe users or user groups to be applied in certain determined cases. These different functions can be used to derive a modified version of the initial L1 ID to resolve the collision issue.

In certain embodiments, the modified version(s) of the initial L1 ID may be based on, for example, any of the following. For example, the modification may be modifying one particular bit of the initial L1 ID for the option of having a single modified version. The modified bit may be the most significant bit or the least significant bit or any particular bit in between, as configured per targeted user or user group. Other examples of modification may be modifying 1 random bit of the initial L1 ID or up to a certain pre-configured number of bits of the initial L1 ID for the option of having more than one modified version. Similar modification rules of the L2 MAC ID may be applied when the L2 MAC ID is to be modified.

If a modified version of L1 ID is used, the modified L2 MAC ID may also be derived accordingly, instead of using MBS part of destination Layer-2 ID, so that the pair of modified L1 ID and modified L2 MAC ID together still identify the same configured destination Layer-2 ID uniquely. For instance, L2 MAC ID may be the bits of the Layer-2 ID that are not used in the modified version of L1 ID. Alternatively, the full Layer-2 ID may be included. In an alternative, the transmitting UE using modified L1 ID and modified L2 MAC ID may explicitly indicate that modification with, for example, 1 bit in MAC PDU header or implicitly by including a full L2 destination ID in a MAC CE once per a SA.

The configured rules may take into account that, for ProSe D2D communications of a large user group in which any individual user may transmit to the rest, the application of modified L1 ID can be omitted or made optional with lower priority.

Certain embodiments can provide effective L1 ID collision resolution at the receiving UE, at least for 1:1 cases or 1:M cases of special user groups in which only a particular user—a commanding one—is speaking and the rest are listening. This, in turn, may improve energy efficiency for the receiving UE. Such an approach, however, may not fully guarantee resolution of all the L1 ID collisions across different transmitting UEs of the same targeted user group.

Certain embodiments may also enhance security aspects of ProSe D2D. In particular, certain embodiments may have rules of determining L1 ID configured specific to individual targeted user or user groups and therefore not known to the outsiders.

In certain embodiments, the UE may monitor for multiple L1 IDs per destination Layer-2 ID. This may result in higher number of packets passing through L1 filtering or even MAC, which may be discarded by L2 later or may be discarded by layers above MAC.

Accordingly, in certain embodiments, a receiving UE can maintain state information about communication associated with each configured destination Layer-2 ID and can configure L1 and/or L2 (MAC) accordingly. The state information for each destination Layer-2 ID can indicate whether UE is not receiving any packets with the initial L1 ID or the alternative L1 IDs; or whether the UE is receiving packets with the initial L1 ID or the alternative L1 IDs, but the packets are not addressed to it, for example the packet may be discarded by an upper layer due to address mismatch, e.g. at a MAC or IP layer; or whether the UE is receiving packets with the initial L1 ID or the alternative L1 ID and the packets is addressed to it, for example, the packet's destination address may be matched at upper layers, e.g. the destination Layer-2 ID in MAC.

The operation of the receiving UE may depend on the state of communication regarding one destination Layer-2 ID as follows. In a state A, which may be a NULL State, the UE can monitors all L1 ID(s) associated with the destination Layer-2 ID.

In State B, which may be a collision detected state, the upper protocol layers in the UE can configure L1 not to monitor L1 ID(s) for a specific time for which it received a packet which included the L1 ID(s) and the destination Layer-2 did not match. In State B, additionally upper protocol layers in the UE can configure L1 to monitor for at least one L1 ID associated with the destination Layer-2 ID when it detects collision for all L1 IDs.

In State C, which may be a communication ongoing state, the upper protocol layers in the UE can configure L1 to monitor for a given time only for L1 ID which was included in a packet for which the destination Layer-2 ID matched. In State C, the time for which L1 monitors the L1 ID either can be a time of ongoing communication, which may be suitable for connection oriented type of communication, or can be a configured time interval, which may be suitable for connection-less communication.

Because the receiving UE does not monitor all L1 IDs, the originating UE may need to attempt to communicate using alternative L1 IDs even though it does not detect any collision.

FIG. 1 illustrates a method according to certain embodiments. As shown in FIG. 1, a system may include a transmitting (Tx) UE, and one or more targeted receiving (Rx) UE or Group.

At 110, the Tx UE can be configured with predefined unique UE IDs and UE Group IDs of all individual targeted Rx UEs and UE Groups, of at least 24 bit length. Then, at 120, the Tx UE can derive a 24-bit Destination Layer 2 ID of the targeted Rx UE or Rx UE Group from the corresponding preconfigured unique UE ID or UE Group ID, if these are not configured to be identical.

At 130, the Tx UE can derive the initial 16-bit MAC ID and 8-bit L1 ID of the targeted Rx UE or Rx UE Group from the corresponding 24-bit Destination Layer 2 ID for ProSe D2D transmissions to the targeted Rx UE or Rx UE Group. An 8-bit L1 ID can be carried in L1 SA—Scheduling Assignment message, and a 16-bit MAC ID can be carried in MAC PDU header.

At 140, the Tx UE can determine if there is any L1 ID collision related to the targeted Rx UE(s) or Rx UE Group(s) of the Tx UE within the ProSe proximity of the Tx UE and if L1 ID collision resolution is needed for any of the related targeted Rx UE(s) or Rx UE Group(s). For example, the initial L1 ID of Rx UE #1 may happen to be the same as that of Rx UE Group #k and, in such a case, a needed resolution may be determined for Rx UE #1.

Meanwhile, at 145, the targeted Rx UE Group #k can determine if L1 ID collision resolution is applicable for the targeted Rx UE Group #k and monitor L1 SA accordingly At 150, the Tx UE can send an L1 SA addressed with the initial L1 ID to the targeted Rx UE Group #k. Then, at 160, the Tx UE can derive the modified L1 ID and, optionally, the modified MAC ID of the targeted Rx UE or Rx UE Group for ProSe D2D transmissions to the targeted Rx UE #1. Meanwhile, at 165, the targeted Rx UE #1 can determine if L1 ID collision resolution is applicable for the targeted Rx UE #1 and can monitor L1 SA accordingly.

Determination of whether collision resolution is applicable can be performed based on some pre-configurations applied to both Tx UE and Rx UE, such as a preconfigured rules that L1 ID collision resolution may be used for unicast or single Tx UE groupcast. Alternatively, the determination of whether collision resolution is applicable can be performed based on some on-the-fly handshaking request or indication initiated by the Tx UE. In a more complex operation, Rx UE may also make its decision to monitor also for modified L1 ID based on some collision prediction. For example, Rx UE#1 can monitor and detect an on-going groupcast in its proximity has the same L1 ID as of its own and therefore can start monitoring for possible modified L1 ID as well.

For example, the modified L1 ID can be derived from the initial L1 ID by changing the value of 1 selectable bit. For instance the last bit can be changed such that if the initial L1 ID is 11000011, then the modified L1 ID is 11000010. Other modifications are also possible, as explained above.

At 170, an L1 SA addressed with the modified L1 ID can be sent to the targeted Rx UE #1.

Assuming that Rel. 12 approaches should be applied as such for all kinds of casting, including group cast, unicast, and so one, then one of the options to avoid L1 collision between different types of casting is to configure and allocate different resource pools for monitoring and receiving SA corresponding to different type of casting. This may also make it easier to enhance or somewhat redesign Rel. 12 ProSe for more efficient unicast and other kinds of casting, in additional embodiments.

Thus, in general certain embodiments relate to identities of ProSe communications. In particular, certain embodiments may relate to 1-1 or 1-M type communications.

One of the IDs used in ProSe is Destination Layer-2 ID, which can be used to identify the target of the data in sidelink ProSe Direct Communication. The Destination Layer-2 ID can be 24 bits long and can be split in the MAC layer into two bit strings.

As mentioned above, the first bit string can be the LSB part (8 bits) of Destination Layer-2 ID and can be forwarded to the physical layer as Sidelink Control Layer-1 ID (L1 ID). This ID can be used for filtering of packets at the physical layer.

As also mentioned above, the second bit string can be the MSB part (16 bits) of the Destination Layer-2 ID and can be carried within the MAC header (L2-MAC-ID). This ID can be used for filtering of packets at the MAC layer.

Figure 2:
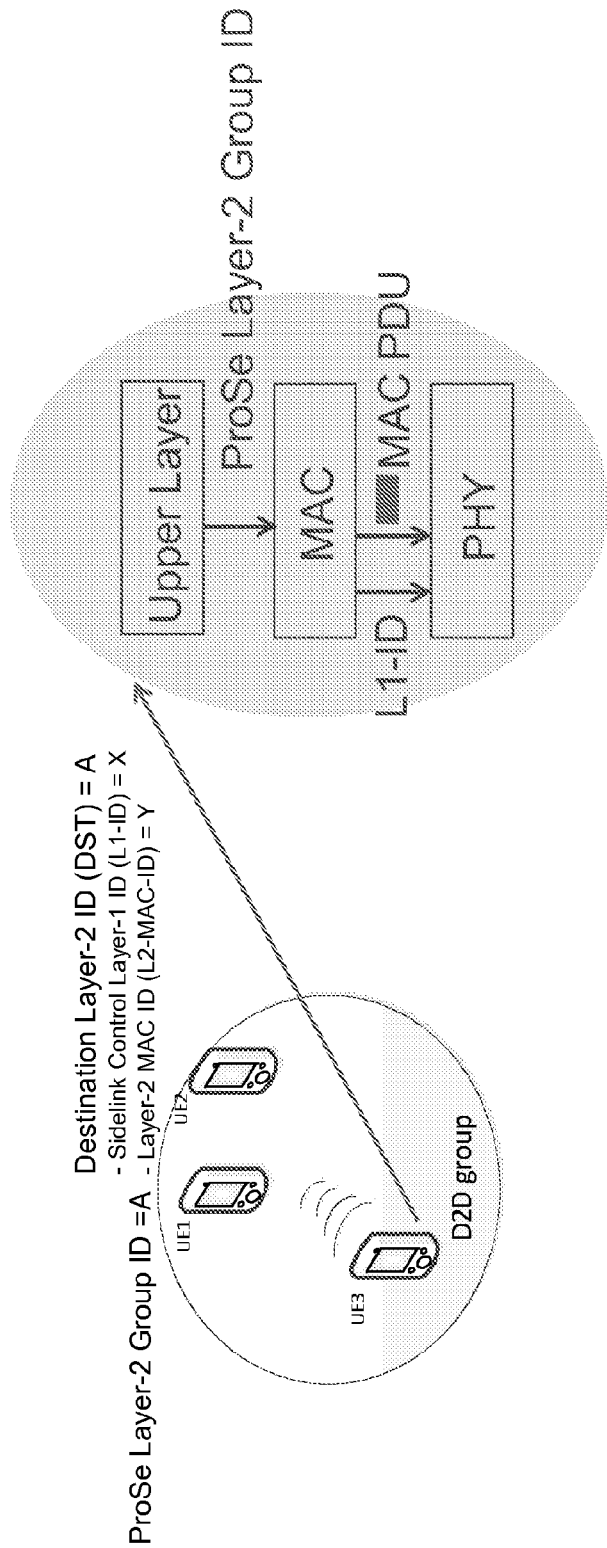
FIG. 2 illustrates transmitting user equipment functions, according to certain embodiments.

FIG. 2 illustrates transmitting user equipment functions, according to certain embodiments. As shown in FIG. 2, a D2D group can include three UEs, respectively labelled UE1, UE2, and UE3. The ProSe Layer-2 Group ID for the group may be "A." The destination Layer-2 ID (DST) can be A, while the sidelink control Layer-1 ID (L1 ID) can be X and the Layer-2 MAC ID (L2-MAC-ID) can be Y.

In this illustration, UE3 can be the transmitting (Tx) UE. Functions in the Tx UE can relate to L1 and L2 filtering. With the protocol stack for UE3 there can be an upper layer, a MAC layer, and a physical (PHY) layer.

As shown in FIG. 2, a ProSe Layer-2 Group ID can be received from the upper layer and can be used as a destination layer-2 ID in MAC. Then, MAC can split the destination Layer-2 ID into sidelink control Layer-1 ID and Layer-2 MAC ID. MAC can signal the sidelink control Layer-1 ID to PHY. Moreover, MAC can include the Layer-2 MAC ID in a MAC header in a MAC PDU sent to PHY.

Figure 3:
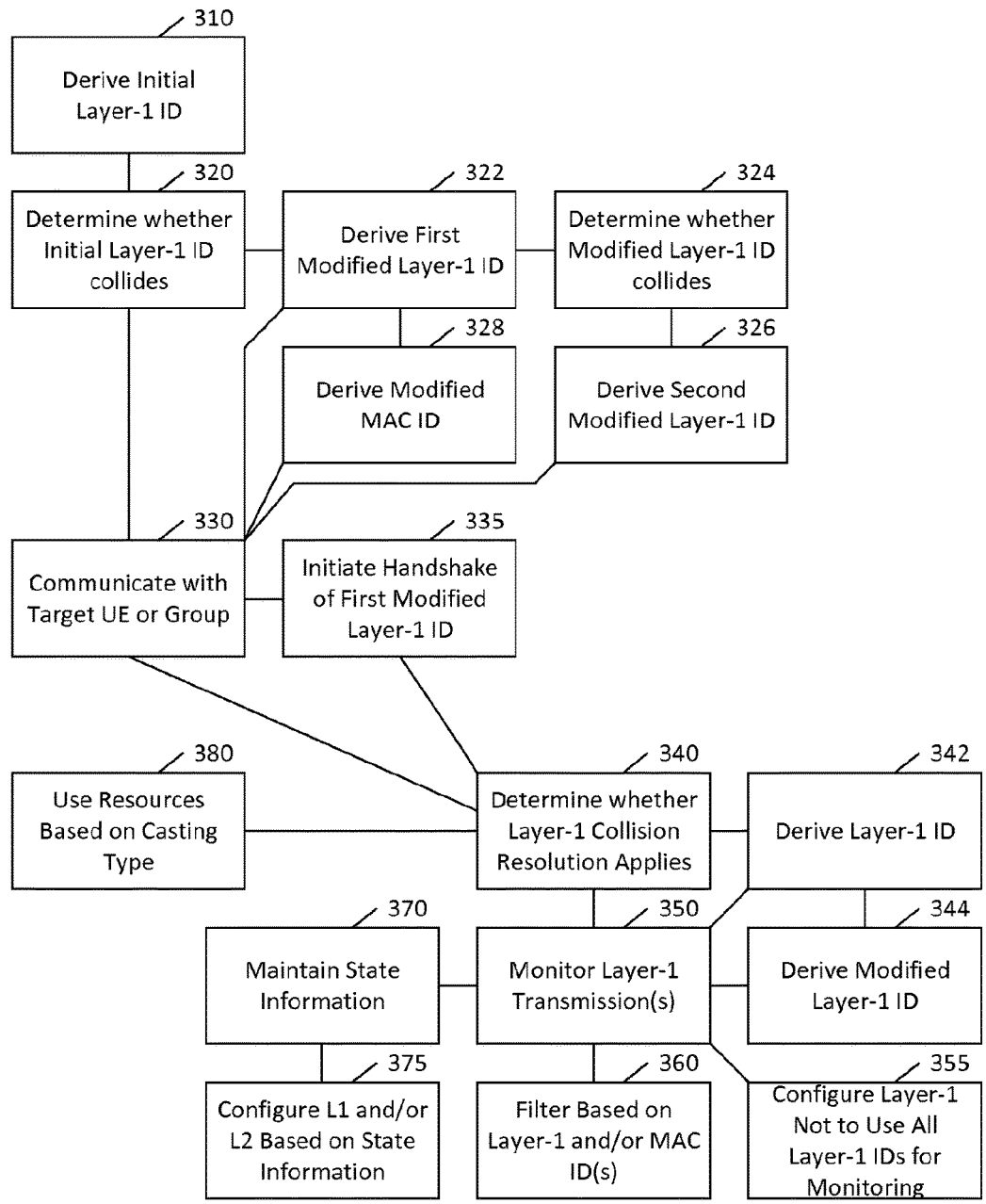
FIG. 3 illustrates a method according to certain embodiments.

FIG. 3 illustrates a method according to certain embodiments. As shown in FIG. 3, a method can include, at 310, deriving an initial layer one identifier corresponding to a target user equipment or group. The method can also include, at 320, determining whether the initial layer one identifier collides with another layer one identifier corresponding to a different target user equipment or group. Furthermore, the method can further include, at 330, communicating with the target user equipment or group based on the determination of whether the initial layer one identifier collides with another layer one identifier in use. For example, when there is no detected collision, the initial layer one identifier can be used.

The method can also include, at 322, deriving a first modified layer one identifier, when it is determined that the initial layer one identifier collides with another layer one identifier in use. Thus, the communicating can include communicating with the target user equipment or group using the first modified layer one identifier.

The method can further include, at 335, initiating a handshake of the first modified layer one identifier. The initiating the handshake can include medium access control signaling at the beginning of a device-to-device session.

The method can additionally including, at 324, determining whether the first modified layer one identifier collides with another layer one identifier in use. When it is determined that the first modified layer one identifier collides with another layer one identifier in use, the method can also include deriving a second modified identifier, at 326.

The method can also include, at 328, deriving a modified medium access control identifier, when it is determined that the initial layer one identifier collides with another layer one identifier in use. Thus, for example, the communicating at 330 can include communicating with the target user equipment or group using the modified medium access control identifier.

The above method features at 310-335 may be performed by, for example, a transmitting user equipment. The various communications mentioned can be received by one or more other device, such as a receiving user equipment or group of user equipment. The method features at 340-360 may be performed by a receiving user equipment.

At 340, the method can also include determining whether layer one identifier collision resolution is applicable to a user equipment or group. The method can further include, at 350, monitoring layer one transmissions, such as a layer one scheduling assignment, based on the determination of whether layer one identifier collision resolution is applicable to the user equipment or group. The layer one transmission may be an L1 control signal or message of a corresponding transmission.

A receiving UE that belongs to one or more preconfigured user groups may need to monitor and receive all possible D2D communications addressed to relevant IDs of the UE's own or user group(s) by itself on the preconfigured pools of resources.

The method can additionally include, at 342, deriving an initial layer one identifier corresponding to the user or group. The method can also include, at 344, deriving at least one modified layer one identifier corresponding to the user or group.

The receiving UE may derive all the possible relevant L1 IDs to monitor and receive right at the beginning when it first determined to monitor for D2D. This determination may be based on the modification rules applicable for this targeted UE or UE group.

The method can additionally include, at 360, filtering based on the Layer-1 ID and/or MAC ID received. Other steps may also be taken as described above, for example in connection with the discussion of FIG. 1.

The method can include, at 370, maintaining state information about communication associated with each configured destination Layer-2 ID. The method can also include, at 375, configuring L1 and/or L2 based on the state information.

The method can further include, at 355, configuring layer one to use only fewer than all layer one identifiers for monitoring and receiving layer one transmission. Thus, layer one can be configured to use a subset of layer one identifiers for monitoring and receiving layer one transmission. The set of layer one IDs can be a union of the initial L1 ID and modified L1 IDs. For example, layer one can be configured not to use all the layer one identifiers when monitoring and/or receiving layer one transmission, but simply to use, for example, the initial L1 ID or one or more of the modified L1 IDs but not the initial L1 ID. Other subset selections are also possible.

The method can also include allocating and configuring resources with respect to casting type. Thus, at 380, the method can include using different resource pools for monitoring and receiving schedule assignment corresponding to different types of casting. For example, resources can be arranged as described above to avoid having collisions between different types of casts.

Figure 4:
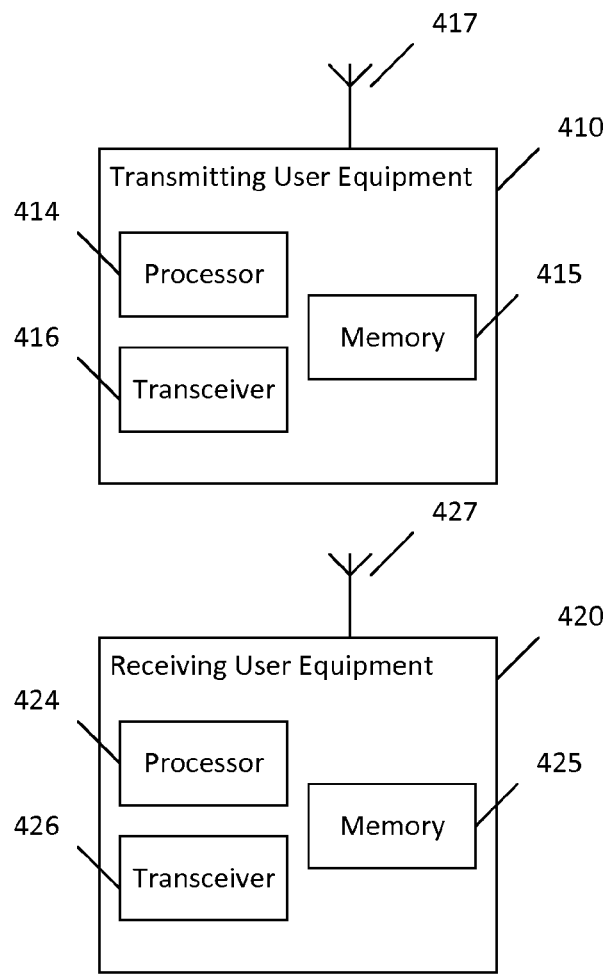
FIG. 4 illustrates a system according to certain embodiments.

FIG. 4 illustrates a system according to certain embodiments of the invention. It should be understood that each block of the flowchart of FIG. 1 may be implemented by various means or their combinations, such as hardware, software, firmware, one or more processors and/or circuitry. In one embodiment, a system may include several devices, such as, for example, a transmitting user equipment 410 and a receiving user equipment 420. The system may include more than one receiving user equipment 420 and more than one transmitting user equipment 410, although only one of each is shown for the purposes of illustration.

Each of these devices may include at least one processor or control unit or module, respectively indicated as 414 and 424. At least one memory may be provided in each device, and indicated as 415 and 425, respectively. The memory may include computer program instructions or computer code contained therein. One or more transceiver 416 and 426 may be provided, and each device may also include an antenna, respectively illustrated as 417 and 427. Although only one antenna each is shown, many antennas and multiple antenna elements may be provided to each of the devices. Other configurations of these devices, for example, may be provided. For example, transmitting user equipment 410 and receiving user equipment 420 may be additionally configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment may be a sensor or smart meter, or other device that may usually be configured for a single location.

In an exemplifying embodiment, an apparatus, such as a node or user device, may include means for carrying out embodiments described above in relation to FIGS. 1 through 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as transmitting user equipment 410 and/or receiving user equipment 420, to perform any of the processes described above (see, for example, FIGS. 1 through 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a transmitting user equipment 410 and a receiving user equipment 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Certain embodiments may provide various benefits and/or advantages. For example, certain embodiments may provide effective collision resolution at a receiving UE at least for 1:1 cases or 1:M cases of special user groups in which only a particular user—the commanding one—is speaking and the rest are listening. However, as mentioned above, certain embodiments may not necessarily eliminate all the L1 ID collision across different transmitting UEs of the same targeted user group.

Also, certain embodiments may also enhance security aspects of ProSe D2D. For example, as described above, certain embodiments may use rules of determining L1 ID configured specific to individual targeted user or user groups. Thus, these rules may not be known to outsiders and may provide a level of security.

Various embodiments may have various flexibilities in implementation. For example, certain embodiments may address an issue related to collision of modified L1 ID. However, using a modified L2 MAC ID may be paired with using a modified L1 ID, whether or not a modified L1 ID actually collides with another user or not. From the receiving UE perspective, the receiving UE may not know if the Tx UE detects there is collision of modified L1 ID or not. Thus, certain embodiments may flexibly permit using modified MAC ID based on collision detected or not in Tx UE for modified L1 ID. Thus, there may be freedom in Rx UE as to which L2 MAC ID, for example original one or modified one, may be used to recover the full target ID.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
    at least one processor; and
    at least one memory including computer program code, wherein the at least one memory and the computer program code are configured to, with the at least one processor, cause a user equipment at least to:
    derive an initial layer one identifier corresponding to a target user equipment or group;
    determine, prior to communication with the target user equipment or group using the initial layer one identifier, whether the initial layer one identifier collides with another layer one identifier corresponding to a different target user equipment or group;
    when it is determined that the initial layer one identifier collides with another layer one identifier in use, derive a first modified layer one identifier corresponding to the target user equipment or group; and
    communicate with the target user equipment or group using the first modified layer one identifier instead.

2. The apparatus of claim 1, wherein the at least one memory and the computer program code are configured to, with the at least one processor, cause the user equipment at least to:
    initiate a handshake of the first modified layer one identifier.

3. The apparatus of claim 2, wherein the at least one memory and the computer program code are configured to, with the at least one processor, cause the user equipment at least to:
    initiate the handshake using medium access control signaling at the beginning of a device-to-device session.

4. The apparatus of claim 1, wherein the at least one memory and the computer program code are configured to, with the at least one processor, cause the user equipment at least to:
    determine whether the first modified layer one identifier collides with another layer one identifier in use; and
    derive a second modified identifier, when it is determined that the first modified layer one identifier collides with another layer one identifier in use.

5. The apparatus of claim 1, wherein the at least one memory and the computer program code are configured to, with the at least one processor, cause the user equipment at least to:
    derive a modified medium access control identifier, when it is determined that the initial layer one identifier collides with another layer one identifier in use.

6. The apparatus of claim 5, wherein the at least one memory and the computer program code are configured to, with the at least one processor, cause the user equipment at least to:
    communicate with the target user equipment or group using the modified medium access control identifier.

7. A method at a user equipment, comprising:
    deriving an initial layer one identifier corresponding to a target user equipment or group;
    determining, prior to communication with the target user equipment or group using the initial layer one identifier, whether the initial layer one identifier collides with another layer one identifier corresponding to a different target user equipment or group;
    when it is determined that the initial layer one identifier collides with another layer one identifier in use, deriving a first modified layer one identifier corresponding to the target user equipment or group; and
    communicating with the target user equipment or group using the first modified layer one identifier instead.

8. The method of claim 7, further comprising:
    initiating a handshake of the first modified layer one identifier.

9. The method of claim 8, wherein the initiating the handshake comprises medium access control signaling at the beginning of a device-to-device session.

10. The method of claim 7, further comprising:
determining whether the first modified layer one identifier collides with another layer one identifier in use; and
deriving a second modified identifier, when it is determined that the first modified layer one identifier collides with another layer one identifier in use.

11. The method of claim 7, further comprising:
deriving a modified medium access control identifier, when it is determined that the initial layer one identifier collides with another layer one identifier in use.

12. The method of claim 11, wherein the communicating comprises communicating with the target user equipment or group using the modified medium access control identifier.

13. A non-transitory computer-readable medium encoded with instructions that, when executed in hardware, perform a process, the process comprising, at a user equipment:
deriving an initial layer one identifier corresponding to a target user equipment or group;
determining, prior to communication with the target user equipment or group using the initial layer one identifier, whether the initial layer one identifier collides with another layer one identifier corresponding to a different target user equipment or group;
when it is determined that the initial layer one identifier collides with another layer one identifier in use, deriving a first modified layer one identifier corresponding to the target user equipment or group; and
communicating with the target user equipment or group using the first modified layer one identifier instead.

14. The non-transitory computer-readable medium of claim 13, wherein the process further comprises:
initiating a handshake of the first modified layer one identifier.

15. The non-transitory computer-readable medium of claim 14, wherein the initiating the handshake comprises medium access control signaling at the beginning of a device-to-device session.

16. The non-transitory computer-readable medium of claim 13, wherein the process further comprises:
determining whether the first modified layer one identifier collides with another layer one identifier in use; and
deriving a second modified identifier, when it is determined that the first modified layer one identifier collides with another layer one identifier in use.

17. The non-transitory computer-readable medium of claim 13, wherein the process further comprises:
deriving a modified medium access control identifier, when it is determined that the initial layer one identifier collides with another layer one identifier in use.

18. The non-transitory computer-readable medium of claim 17, wherein the communicating comprises communicating with the target user equipment or group using the modified medium access control identifier.

* * * * *